I. W. BOESHANS.
CAMERA TRIPOD.
APPLICATION FILED MAR. 26, 1909.

1,004,352.

Patented Sept. 26, 1911.

Witnesses
J. B. Gah.
D. W. Gould.

Inventor
Irvin W. Boeshans,
By Victor J. Evans
Attorney

UNITED STATES PATENT OFFICE.

IRVIN W. BOESHANS, OF COLUMBUS, OHIO.

CAMERA-TRIPOD.

1,004,352.  Specification of Letters Patent.  Patented Sept. 26, 1911.

Application filed March 26, 1909. Serial No. 486,002.

*To all whom it may concern:*

Be it known that I, IRVIN W. BOESHANS, a citizen of the United States, residing at Columbus, in the county of Franklin and State of Ohio, have invented new and useful Improvements in Camera-Tripods, of which the following is a specification.

The invention relates to an improvement in camera tripods, and is particularly directed to a means for securing the camera to the tripod in a manner to permit the convenient positioning of the camera and the fixed securing of the camera in the desired position without moving the tripod.

The main object of the present invention is the provision of a camera engaging means carried by the tripod and normally arranged for free rotary movement on the tripod while fixed to the camera, whereby when the camera is in position it may be adjusted to any desired position in a horizontal plane, the construction including a means for fixing the camera engaging means with relation to the tripod when desired.

The invention will be described in the following specification, reference being had particularly to the accompanying drawings, in which:—

Figure 1:
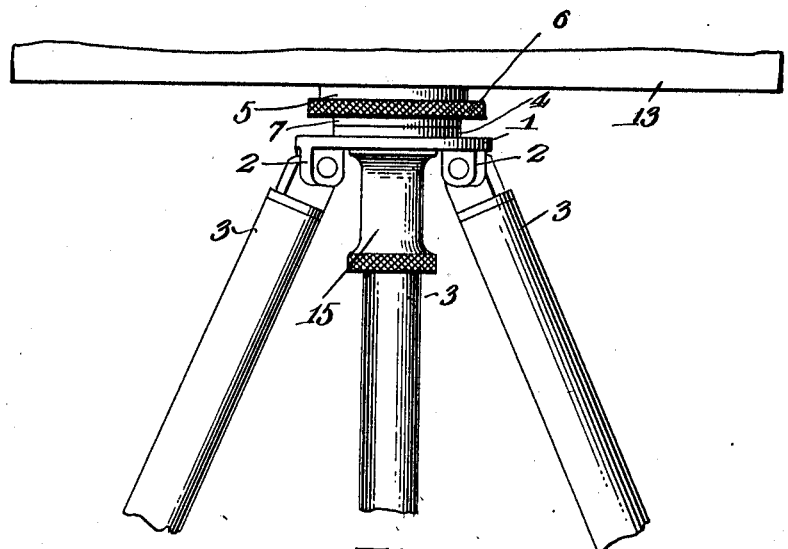
Figure 2:
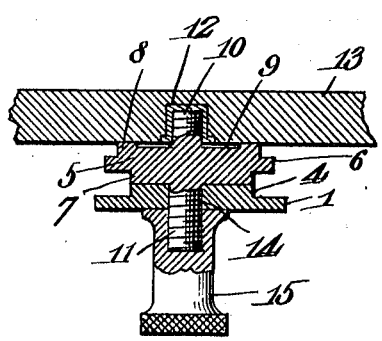
Figure 3:
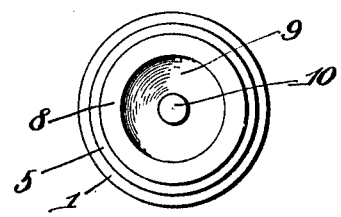

Figure 1 is a view in broken elevation, illustrating the improvement. Fig. 2 is a vertical section, partly in elevation, through the camera base, the securing plate, the tripod head and the thumb nut for fixing the plate to the head. Fig. 3 is a plan of the securing plate.

Referring particularly to the accompanying drawings, 1 is a camera head, preferably of the usual circular form in plan having depending ears 2 arranged in pairs, between which the camera legs 3 are pivotally mounted. Aside from the details to be hereinafter noted the form of the tripod is immaterial so far as the present invention is concerned, for which reason I contemplate the use of camera legs of telescopic or any other form connected to the plate in any desired manner.

For the purposes of the present invention the head plate 1 is provided with an upwardly extending centrally arranged off-set 4, forming a supporting base for the securing plate, as will be hereinafter explained.

The essential feature of the present invention resides in a securing plate 5 preferably an integral body having a central portion 6 of the maximum diameter, the peripheral edge of which is roughened to provide for convenient manipulation. On the lower portion of the operating disk 6 is secured a depending centrally arranged circular plate or spacing disk 7, which, when the securing plate is in position, is designed to rest upon the supporting base 4, the plate 7 corresponding in diameter to that of the base 4. On the upper surface of the operating disk 6 there is secured an upwardly extending centrally arranged track 8 forming a camera support. This track has a diameter slightly exceeding that of the plate 7, to insure a more effective securing of the camera thereto.

The securing plate is provided with upwardly and downwardly extending threaded plugs 10 and 11, the former being designed to engage a threaded socket 12 secured in the camera base 13 and the latter passing through an opening 14 in the supporting plate 4 and head plate 1 of the tripod, projecting below the head plate to be engaged by an elongated thumb screw 15.

In use it is obvious that with the tripod in set position the camera is free to be rotated in position in a horizontal plane by loosening the thumb nut 15, and then fixed in the desired position by tightening the thumb screw. As will be apparent from Fig. 1 of the drawings, the adjustment and fixing of the camera with relation to the tripod may be readily accomplished without disturbing the tripod's adjustment, thereby conveniently adapting the device for taking a number of pictures of different points from the same tripod position. The adjustment of the camera with relation to the tripod after loosening the thumb nut 15 may be readily accomplished by manipulation of the milled disk 6, as will be obvious, the provision of the plates 7 and 8 spacing the camera from the head plate of the tripod to permit such operation.

Having thus described the invention what I claim as new, is:—

A device of the class described including a circular body, a depending circular extension formed on the under side of said body and having a diameter smaller than that of the body, an annular track formed on the upper side of the body and having a diameter smaller than that of the body, that portion of the body projecting beyond the track and extension forming a manipulating member, a threaded plug formed on and depending from the under side of said extension, and a threaded plug formed on and rising vertically from the body, said last named plug being arranged centrally of the track and coöperating therewith to rigidly secure a camera to the body.

In testimony whereof I affix my signature in presence of two witnesses.

IRVIN W. BOESHANS.

Witnesses:
GEO. LICHTNER,
OSCAR SIEBERT.